(12) United States Patent
Ishikawa et al.

(10) Patent No.: US 7,913,282 B2
(45) Date of Patent: Mar. 22, 2011

(54) DISTRIBUTED COOPERATIVE MEMORY FOR INTERACTIVE AND SCALABLE VIDEO-ON-DEMAND SYSTEM

(75) Inventors: Edison Ishikawa, Rio de Janeiro (BR); Cláudio Luis Amorim, Rio de Janeiro (BR)

(73) Assignee: COPPE/UFRJ-Coordenacao Dos Programas De Pos Graduacao De Engenharia Da Universidade Federal Do Rio De Janeiro, Rio De Janeiro (BR)

( * ) Notice: Subject to any disclaimer, the term of this patent is extended or adjusted under 35 U.S.C. 154(b) by 2069 days.

(21) Appl. No.: 10/239,796

(22) PCT Filed: Mar. 26, 2001

(86) PCT No.: PCT/BR01/00029
§ 371 (c)(1),
(2), (4) Date: Sep. 25, 2002

(87) PCT Pub. No.: WO01/74076
PCT Pub. Date: Oct. 4, 2001

(65) Prior Publication Data
US 2003/0093803 A1    May 15, 2003

(51) Int. Cl.
*H04N 7/173* (2006.01)
(52) U.S. Cl. ........... 725/87; 725/88; 725/90; 725/93; 725/94; 725/100; 725/102; 709/213; 709/214; 709/216

(58) Field of Classification Search ........... 725/87–88, 725/90, 93–94, 100, 102; 709/213–214, 709/216
See application file for complete search history.

(56) References Cited

U.S. PATENT DOCUMENTS

| | | | | |
|---|---|---|---|---|
| 5,357,276 A * | 10/1994 | Banker et al. | ............ | 725/102 |
| 5,610,841 A * | 3/1997 | Tanaka et al. | ............ | 725/115 |
| 5,629,732 A * | 5/1997 | Moskowitz et al. | ......... | 725/102 |
| 5,631,694 A * | 5/1997 | Aggarwal et al. | ............ | 725/93 |
| 5,920,700 A * | 7/1999 | Gordon et al. | ............ | 709/226 |
| 5,956,716 A * | 9/1999 | Kenner et al. | ............ | 707/10 |
| 6,049,823 A * | 4/2000 | Hwang | ............ | 725/82 |
| 6,374,289 B2 * | 4/2002 | Delaney et al. | ............ | 709/203 |
| 6,473,902 B1 * | 10/2002 | Noritomi | ............ | 725/91 |
| 6,543,053 B1 * | 4/2003 | Li et al. | ............ | 725/88 |

* cited by examiner

*Primary Examiner* — Brian T Pendleton
*Assistant Examiner* — Nnenna Ekpo
(74) *Attorney, Agent, or Firm* — Fildes & Outland, P.C.

(57) ABSTRACT

A Distributed Video System provides a scalable and interactive video-on-demand service with VCR operations over a communication network includes a video server and video clients, each of which includes a memory buffer, called a client buffer. The System provides a method of managing video frames of client buffers in a cooperative way with video frames held in the video server allows the video frames of the client buffers to be shared among the video clients. Requests for a video are primarily served by the video clients that have the requested video frames in their client buffers and only requests that the video clients are unable to attend to will be provided by the video server.

15 Claims, 5 Drawing Sheets

DISTRIBUTED COOPERATIVE MEMORY FOR INTERACTIVE AND SCALABLE VIDEO-ON-DEMAND SYSTEM

TECHNICAL FIELD

This invention relates generally to Video-on-Demand systems, in which the buffers at the client side of the system are used in a cooperative way to offer a scalable and interactive service, including VCR facilities.

BACKGROUND OF THE INVENTION

The Video-On-Demand (VoD) system is an electronic solution to deliver movies to remote users over a broadband computer network. It implements an electronic video-rental store that supports interactive facilities of video playback stations over a computer network while eliminating the inconvenience to the users of associated video-cassette rental problems.

Another advantage of the VoD system over usual broadcast TV or cable TV is the possibility to the user to watch a movie at any time, pause the movie at any moment, forward, and rewind it as the user wishes.

Figure 1:
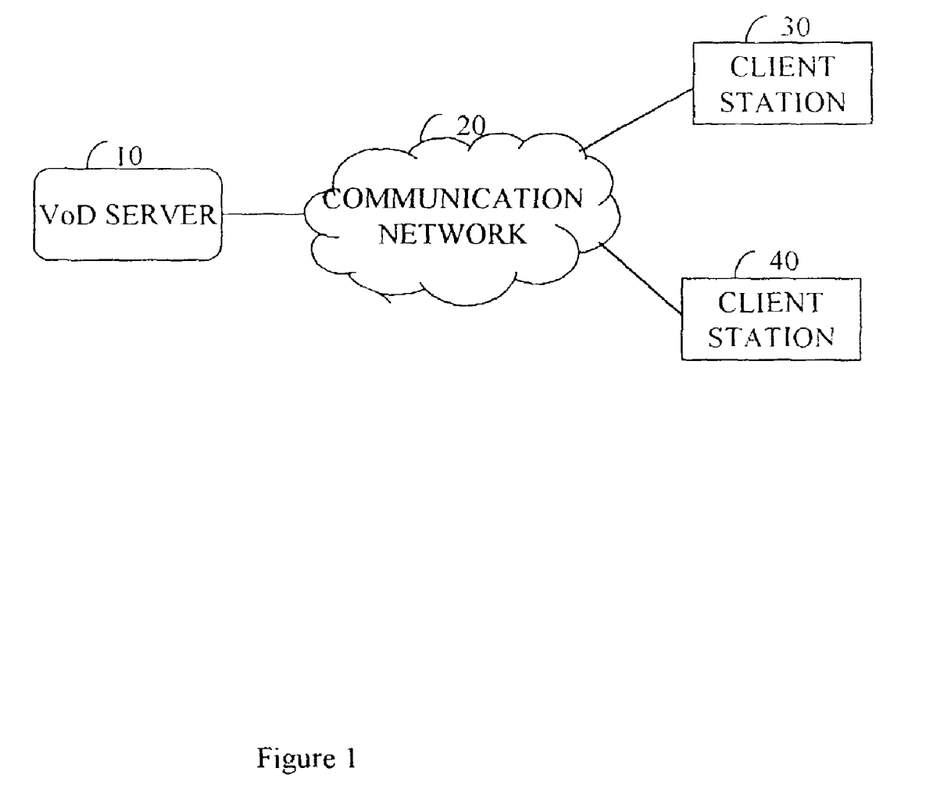
FIG. 1 displays the architectural framework of the present invention.

The general architecture of the VoD system is composed of 3 parts: At one end is the VoD server 10 in which movies are stored, in the middle is the data communication network 20 which transports the flow of digitized movie frames, and at the other end is the client stations 30. The client station can be a TV with a decoder box (setup box), a computer, or even a TV with an embedded computer.

The general mechanisms of a VoD System are very simple. The client requests electronically a movie that has been chosen from a video catalog accessed by an Internet browser. Once a new connection is establish between the VoD server and the client machine, the server sends a video stream across the network to the client machine. During the movie exhibition, the user can execute pause/resume, fast forward, or rewind operations. When such operations are requested, they are sent to the server, which will interrupt the video stream if a pause command was executed or it will send the video stream at a higher speed in reply to a fast-forward operation request. These and other commands can be executed by the server itself or by specialized agents that help the server by sharing the server workload.

The basic issue of a VoD system is scalability in the sense that the system has to support an increasingly large number of users without having to increase the server resources linearly. Current solutions scale the system, but the resulting system is more limited than the original one, for instance, it offers neither VCR facilities nor the option to start a movie at any instant of time. Usually such techniques use a multicast stream with mechanisms for batch, bridging, or piggybacking, which try to group two or more streams into one stream for multicasting. To start video exhibition at any time, another solution that has been proposed is patching, which uses another channel to download the initial portion of the movie while the current movie stream is buffered at the client; yet, this technique doesn't allow VCR operations.

An attempt to allow pause/resume operations using multicast with the techniques referred above, is to use a large buffer in the client in such a way that if the client wants to pause and resume afterwards, the client will have the movie available in the local buffer. In this way, the server will have more time to complete the resume operation. The same scheme works for both ff and rw operations. Although such a mechanism works at low operation rates, the chance of blocking at higher operation rates is considerable. This happens because the server may have all of its resources occupied attending other requests while the client buffer becomes empty. A common solution used to alleviate this problem, is to reserve some server resources to answer VCR operations, even though the allocated resources may not be sufficient and the system will block.

An obvious conclusion is that one of the system bottlenecks is the server capacity and a solution to that is to increase the number of servers. Using several servers or an expensive server with enough capacity to sustain a large number of video streams will lead eventually to network congestion, specially in the network link between the server and the network, even using multicast. So, another system bottleneck is the bandwidth of the network link to the server and one solution to increase server bandwidth is to distribute the server across the network, which also increases the system costs.

One interesting idea is the one that tries to avoid the server bottleneck by chaining the client buffers so as to build a delay line. Chaining improves the capacity of the system by recycling the video stream that is discarded after the exhibition, redirecting it to another client that can make use of it. The redirection may be extended indefinitely, forming long chains through which video streams can be propagated. Using chaining we can buffer a huge amount of videos in the system, which can be reused to generate new video streams using multicast.

Our invention is new in the sense that it uses the buffer storage space not only as a delay line, but also as a single view of memory space that can be managed in a cooperative way to offer VCR facilities to the VoD system in a scalable manner. The resulting VoD system has the following advantages:

1—the user can watch the exhibition of a movie of his/her choice "quasi" instantaneously, without the need to wait either for the buffer to fill up or to the next slot of a multicast transmission;
2—the user can forward or rewind any movie portion continuously not only the stored movie stream while alleviating the server from the burden of using exclusive video streams to support interactive functions;
3—to be scalable by minimizing the server access when the movie is cached in the collective memory;
4—to be more fail-tolerant, since existing copies of the movies in the collective memory can be used as alternative video streams under unexpected events, such as network failures;
5—to guarantee Quality of Service, since the mechanism we devised can adapt to changes of network traffic variation.

SUMMARY OF THE INVENTION

The present invention discloses a new method to improve the scalability of interactive Vided-on-Demand (VoD) Systems with VCR functions using the client buffers in a cooperative way called Distributed Cooperative Memory (DCM). The main advantage of DCM is to enable easy implementation of VCR operations within a VoD System, while keeping the demand of video streams at low level on both the VoD server and communication links.

When a user requests a movie then right before watching the movie, the client station stores a piece of the movie in its local buffer. Thus, if any client station needs a piece of the movie that is stored in the local buffer of another client, it doesn't need to ask the VoD server for another video stream, instead the server only locates and selects a client which has the requested piece of movie. The selected client then either forwards the received video stream or sends the requested video contents in a burst in the case of a fast forward or rewind operation with exhibition. This mechanism is used to implement the VCR operations and can be extended to several clients.

The full potential of this method is achieved whenever there are many client buffers storing redundant copies of movie pieces. Therefore, this method scales well for large audiences of popular movies during prime viewing time. In the case of less popular movies or outside the prime viewing time the clients also may cooperate to help the VoD system (and in consequence other clients) to offer VCR features to other users who watch movies with small audiences during the prime viewing time or even to increase the number of movie pieces that are buffered within the system outside the prime time.

In order to implement the DCM, the standard client buffer is augmented to support the DCM working area that is used to improve the system services, by offering better services at lower costs. The objective of adding a supplementary buffer is to keep either less popular movies or popular movies that are watched outside the prime time, stored in the system. In addition, it can help the system to extend the buffer chains. The main reason to manage these cooperative buffers is to offer large amount of videos that can be stored across the network, so that the demand on the server and its link are reduced dramatically. Furthermore, when the client buffer is not used, for instance, when a broadcast movie has been watched, the entire buffer can be used by the DCM VoD system to improve its VoD service.

BRIEF DESCRIPTION OF THE DRAWINGS

The objects, advantages and novel features of the invention will be more fully apparent from the following detailed description when read in connection with the accompanying drawings wherein.

DETAILED DESCRIPTION OF THE INVENTION

A VoD system is composed of a VoD server 10 with stored movies and many clients 30 40 interconnected by a data communication network 20.

The server consists of one or more processors, and it is responsible for sending the video flows correctly, to receive and process requests for new connections and VCR operations, to support these requests in the best possible way, to tariff the use of the service and, in this invention, to manage the Distributed Cooperative Memory (DCM), which comprises all the client reception buffers (standard and supplementary) that are in the system. Obviously these functions can be distributed among several computers that will execute the required tasks in an efficient way.

The client station is qualified to receive video flows and to display them to the user. Besides, clients communicate with the server to request interactive services like VCR operations. As the network can present variations in the video delivery rate as shown in the illustration 1, the client station usually contains a standard reception buffer 50, simply called buffer, to compensate for that variance. To diminish the impact of VCR operations on the server and also to provide enough time to the system to reply to some requests within appropriate time, the buffer size is increased. The larger the buffer size is, the larger is the time to compensate for the system latency, and also the time to fill it up. This time can be reduced by increasing the transmission rate until the buffer reaches its minimum level of work.

It should be clear that, all the client stations are assumed to have a buffer to store movie pieces that are to be exhibited. The client station should not store the entire movie due to copyright restrictions, besides the high cost to store a full movie. In conclusion, the client station needs a buffer to use the services of the VoD system. It can also share its buffer with other users, after all such a buffer sharing will not increase user's costs to purchase a client station, besides the system can offer a better quality of service at the same cost. Also, the client can provide a small supplementary buffer to the system. Whereas a single supplementary buffer will not solve all the VoD system problems, the area which corresponds to all the supplementary buffer added together will provide an immense work area that the system can take advantage of it, for instance, to store the trailers of the movies being watched. As a result any of the stored trailers can be quickly loaded into the local buffer of new clients as soon as they request any of the available stored movies, thus avoiding the delay to fill the buffer until it reaches the minimum level of work for starting the video exhibition. Thus, it is desirable to chain the buffers and to use the supplementary buffers to the benefit of the VoD system. The challenge at this point is to manage those buffers so that they can cooperate in an efficient way across a network that has statistics variance in the delay time.

Data Structure

The client buffer is divided into parts for administrative purposes and pointers are used to define its limits. The buffer can be implemented in a circular manner, so that pointer movements instead of frame movements inside the buffer are required. The buffer is divided in two parts, the standard part and the supplementary part. The standard part, which usually exists in the client station, is described as follows. The first pointer indicates the beginning of the video stream stored in the buffer 51 (FIG. 2), as the video pictures are discarded the pointer is updated.

Figure 2:
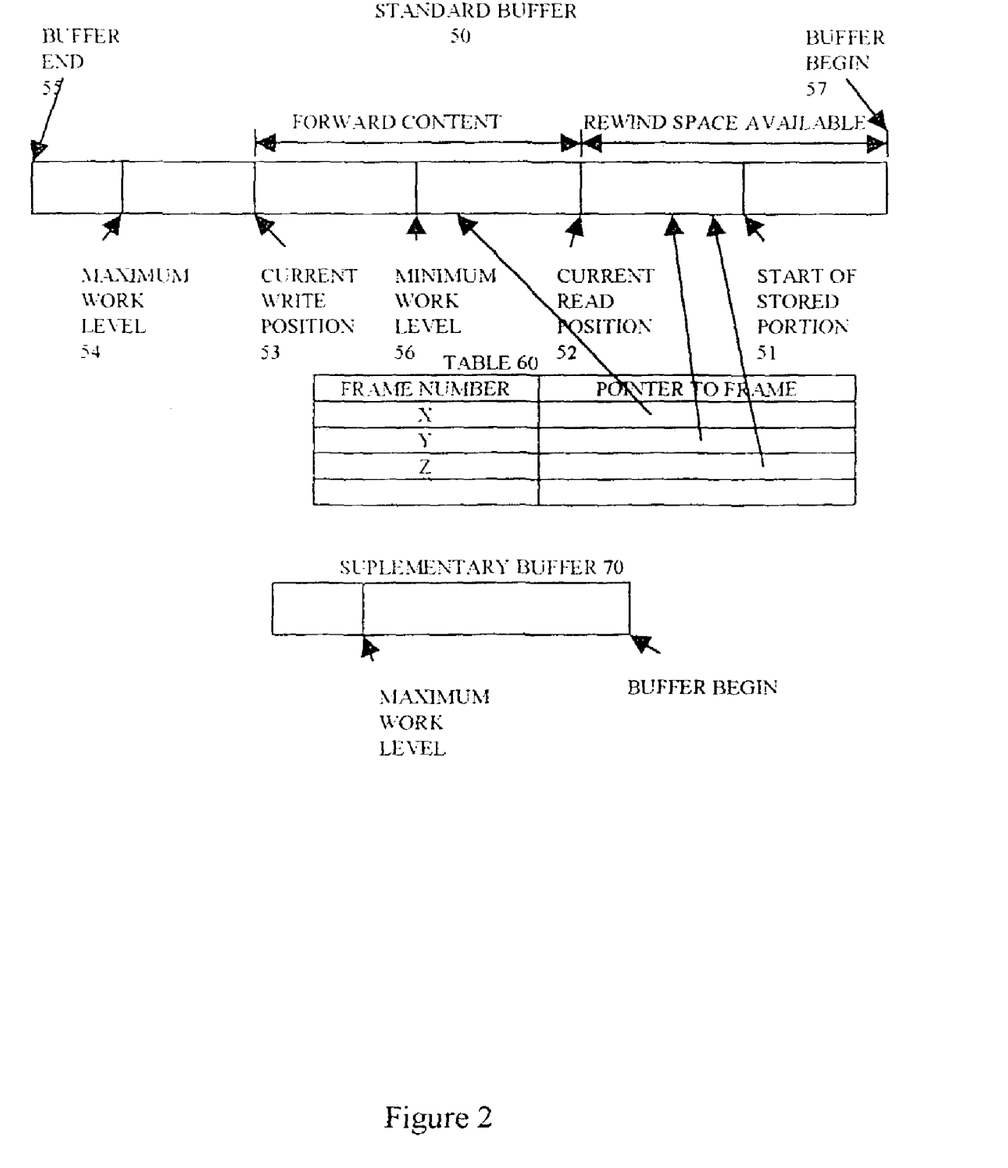
FIG. 2 displays a conceptual diagram of the buffer division.

The second pointer indicates the current reading position 52, that can coincide with the initial frame pointer 51, when there is any frame available. The frames that are between those two pointers can be used as a time slack for rewind operation.

The third pointer indicates the writing position 53 of the frames that have been received. The difference between the current reading pointer 52 and the current writing pointer 53 indicates the buffer space to store the necessary frames and can be used as a time slack for fast forward operation.

The fourth pointer indicates the minimum level of work 56 that is necessary to guarantee that any lack of frames doesn't occur due to network delays, and also to compensate for the network latency to attend fast forward and resume requests. The distance between the fourth pointer and the current reading pointer 52 is constant and both pointers are simultaneously updated. When the current writing pointer 53 is below the minimum level of work, the client station generates a system call that handles potential video stream failures by making contact with the DCM manager, which will start a new video flow to fill the buffer until its minimum level is reached again.

The fifth pointer indicates the maximum level of work 54, which should never be surpassed by the current writing pointer 53, under the risk of causing overflow. The distance between the fifth pointer and the current reading pointer 52 is also constant, and the two pointers are simultaneously updated. When the current writing pointer 53 is above the maximum level of work, it is generated a near-overflow system call to the DCM manager which will attempt to decrease the transmission rate to this client. If this is not possible, the DCM manager either sends another video flow with a smaller rate starting at the last received frame, or a video flow after a small time interval so that there is enough time to empty the buffer below the near-overflow level and to begin the transmission of a new or recycled flow. A recycled flow is one that is reused from some cooperative buffer. A new flow is one that is generated exclusively by the server to assist a request.

The client station also has a pointer that indicates the origin station or server from which it has received the video stream, as well as the client station(s) to which the video stream are propagated so that a chain of client stations can be established.

In addition, each client station maintains a table 60, which is always updated, with the frames it holds in its local buffer and pointers to their associate buffer positions.

The supplementary part is managed differently from the standard buffer. While the utilization policy of the standard buffer gives all the priority to the exhibition of movies that the users choose, the utilization policy of the supplementary part is such that its utilization will benefit the system as a whole. Nevertheless, in many situations this policy can be used also to the benefit of the client station that has the supplementary part if this is useful to the VoD system.

The supplementary part 70 (FIG. 2) can be used within both dynamic or static ways. In either case it possesses a pointer that indicates the preceding object (server or client station), as well as the successor object(s), generating a chained list.

The supplementary part when is used in a dynamic way it acts like a retard buffer that allows the connection of two chains that are separated by a small number of movie frames, otherwise these two chains can't be connected and the server have to send another video stream. Obviously chaining the supplementary buffers can increase this retard buffer. In this case, the distributed buffer is itself a retard buffer and has the same pointers as a standard buffer.

The DCM system uses this supplementary part in a static way when a part of the movie, e.g. the video trailer, is stored in a chained of supplementary buffers, which can be sent to other standard buffers so as to avoid a "burst" into the server and also to fill quickly the destiny buffer. Working in this way is static because a video flow doesn't exist inside the supplementary part. Without a video flow in the supplementary part its contents doesn't need to be discarded, therefore it can be used to complete other client buffers. This portion of stored movie can be replicated in several supplementary chains in a distributed way across the network, decreasing the traffic in the network and increasing the availability of that movie portion.

The DCM manager maintains two tables to manage the standard buffer. One table contains the client station information which is showing the video, whereas the other table holds the movie frame enumeration or any other unit that indexes the movie contents, and pointers to memory positions where the movie contents are stored. A movie can be completely stored in primary memory (RAM), in secondary memory (hard disk), or in a combination of primary and secondary memories.

The client information table maintains the client identification, the size of used space for rewind, and the minimum and maximum levels of work of the standard buffer. While such information can be reduced and eliminated if the buffer size is standardized for all the clients, it will decrease system flexibility. It also has a field that holds pointers to the next and previous clients, so as to control the linkage of buffers, and another field with the initial and final frames held in the buffer when the client issues a pause operation. This table also keeps the time at which the client began to watch the movie; this time is based on the server clock. Several algorithms of public domain exist to estimate this time, the most simple one is to mark both the time at which the request was transmitted and the time when the answer is received. The difference between the two clock times gives the round trip time of the message, so the latency between the server and the client is the round trip time divided by two. Since the server can register the time when it began to transmit a video stream and also the amount of bytes that is transmitted, it can calculate when the client buffer reached the minimum level of work and consequently the time when the movie exhibition began. In case of a client station interrupts the movie exhibition for any reason, then upon resuming the exhibition it will send a notification to the server, which annotates the time of the arrival of this notification and subtracts the transmission time of this message from the movie starting time; this time difference is used to update the beginning time of the movie visualization from the server point of view. This time now becomes a virtual time, since it is the time that the client should have begun to watch the movie in order to visualize the current scene. This will be the reference time used by the server to calculate which frames are in that particular client buffer. The beginning time of a movie visualization is zero if the customer didn't start yet to visualize the movie, i.e., it is still filling its buffer to reach the minimum level of work. This table also stores the state of each client supplementary part and it has pointers that indicate the linkage of these supplementary parts or simply supplements.

The server has also four control lists: a list of free supplements, a list of supplements that have stored movie portions, a list of supplements that can be used as retard buffers, and a list of available client buffers that have not been used and therefore can be transferred to the system so as to optionally increase the supplementary buffer area (i.e., using the area of the standard buffer as a supplementary area).

Operation

The DCM operation will be explained using only one movie and one server, since it makes the DCM simpler to better understanding. However, DCM can be used with several movies within a single server, one movie distributed in several servers, or several movies distributed in several servers. The servers can be also distributed in a cluster of computers in a centralized way or distributed across the network. Also, the proposed mechanism works with a constant bit rate video stream or with a variable bit rate, and with video frames with constant or variable size, compressed or not. If compressed, the system can work with standard formats like MPEG1, MPEG2, MPEG4, and MJPEG, supporting low resolution up to high resolution like HDTV. The work unity may be a video frame or a group of video frames.

A customer upon requesting a video, through a client station, sends a request to the DCM manager which will ask either the server for the video stream or the buffer chain to send the stream to the client buffer. As it is the first request to the movie, and also it has not been stored in any of the supplements, the server has to provide this new video stream. When the buffer reaches its minimum level of work the client station begins the exhibition of the video. Up to this point the operation is similar to other VoD systems. If the initial portion of the movie is already buffered in the supplements, the video workload that is necessary to reach the minimum level of work can be accelerated, because each chain of supplements that has the requested portion of the movie can supply its contents in parallel and the server needs only to provide the video stream of the remaining space, as will be explained bellow.

Figure 3:
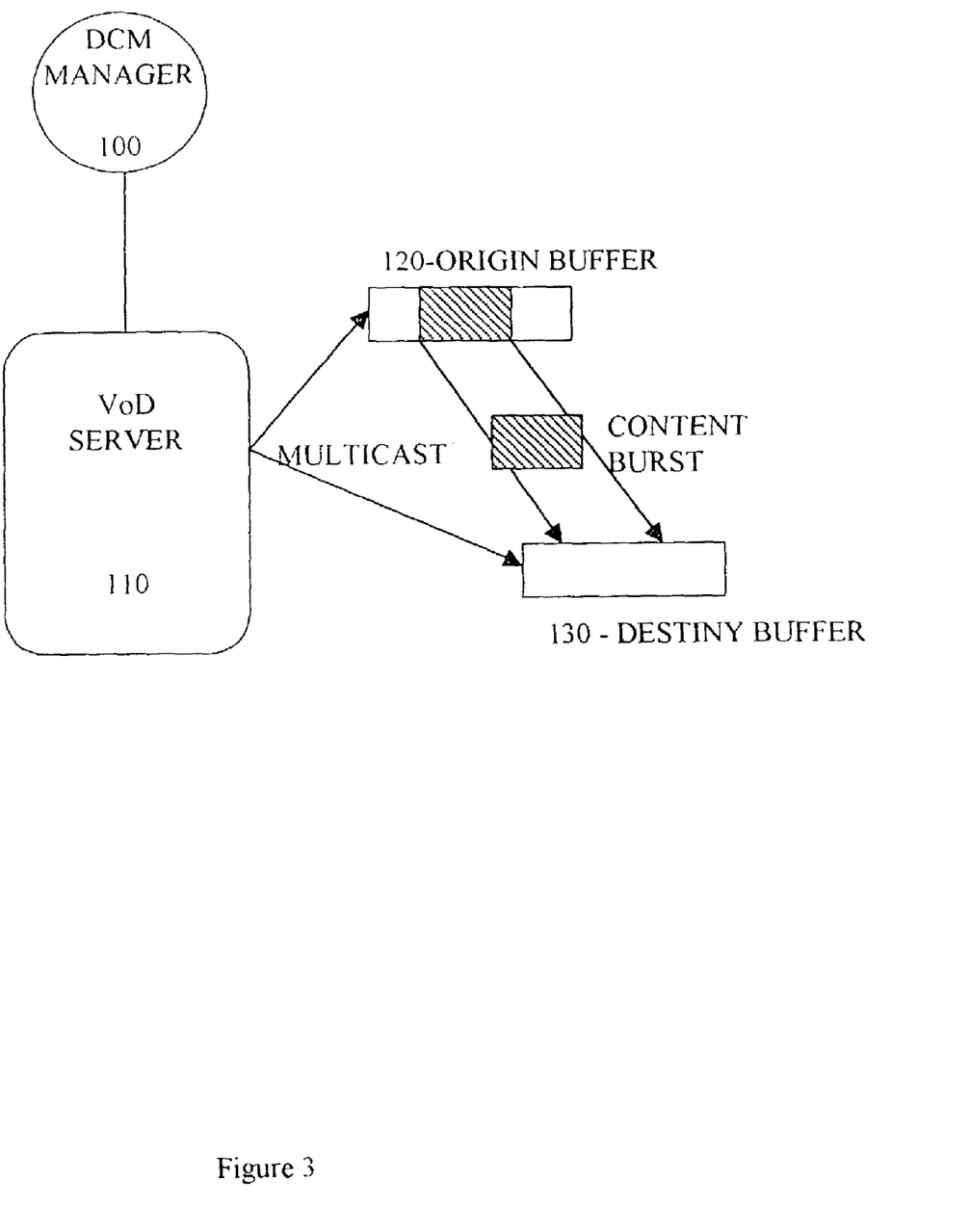
FIG. 3 Shows a stream derivation

If another video request arrives, the DCM manager looks up its table with the client's information and verifies that there exists a client station 120 (FIG. 3) that has a buffer with the initial portion of the movie and estimates that the available space in the client buffer for rewinding was not filled up and that it could be empty if the movie didn't begin to be exhibited. Therefore, there is enough time for the client that asked the movie 130 (FIG. 3) to receive an order from the DCM manager to connect with the client station and ask for a video stream from its current buffer contents. As the rewind space was not full at the time it started to send the video stream, the system ensures that no byte from the beginning of the movie is discarded.

The video flows to both the origin buffer 120 (FIG. 3) and the destiny buffer 130 are derived from a server-base flow in a multicast fashion. This deriving procedure applies to other video portions, not only to the initial video portion, as well as to other video request points along the chain.

The verification procedure knows whether there is a client station holding the initial part of a movie in its buffer or not, as follows. First it verifies if the initial portion is stored in the supplementary part, if not it checks the client table for a client that has already received the video flow, but didn't begin yet to see the movie or a client that has already started to see the movie, but for which the start time less the server time is smaller than the length of time of the movie stored in the rewind space, plus the time for the other client to receive the server information, make the connection and the cooperative buffer start sending its video stream. This procedure is necessary to guarantee that any byte of the first frame will not be discarded, before the recycled flow is sent to the requested client station. The amount of movie stored in the rewind space in time units can be obtained from the movie table in the following manner. Assume that at the time (t) the frame (f) is exhibited. Add all the previous frame sizes before frame f until the size of the rewind space is achieved, or less than that if the beginning of the movie is reached. Given that the frames are exhibited at a constant rate, it is enough to divide the number of pictures by this rate, to obtain the length of time of a movie stored in the rewind space.

This procedure can be repeated indefinitely, generating a chain of client stations that are interconnected by a continuous video flow. As it is difficult to guarantee constant delays in the network, it is possible that this continuous flow become very low in some points of the network, causing some buffers to empty and other buffers to overflow. To solve such problems the DSM system uses the pointers that indicate the minimum and maximum levels of work. The movie contents that are between these two pointers, act like an elastic mechanism to the buffer and gives large flexibility to the DCM VoD system. Another problem is the phase shift that can happen between the beginning time of exhibition as registered in the server and the correct exhibition time, given by the movie current time minus the real time. This problem is well solved if one notice that the buffers are interconnected within a chain, so if there is an error in the designation of a buffer, it is enough to redirect this request to either the previous or the next buffer, depending on whether the requested portion is located behind or ahead, respectively.

If the initial movie portion is stored in the supplementary part, it is possible to decrease the buffer waiting time without increasing the server load. For that the contents of the initial portion has to be in a sequence of supplements and the requested movie has to be sent in parallel to the destiny station. At the same time the DCM manager provides the flow that should follow the initial portion. If the initial portion is highly demanded, this sequence of supplements, which store the initial video stream, can be replicated in several points of the network. If the initial portion is not in the supplements, the DCM manager locates the buffer of the chain that has the initial portion, sends its content at high transmission rate to the destiny buffer, and the flow that reaches the contributor buffer, is also forwarded to the destiny buffer using a multicast stream. The flow concatenation in the destiny buffer is simple, the DCM manager knows at which point the server started the multicast to the buffer destiny, so it orders the cooperative buffer to send its contents up to that point.

If the flow is interrupted for any reason, the buffer contents will be gradually consumed due to the video exhibition until it reaches its minimum level. At this time, a system call is generated that will notify the DCM manager which will ask for a flow to this buffer, coming either from another buffer or the server. The client knows the last received frame, so it can request the next frame to the DCM. In any case, the buffer space between the reading pointer and the pointer of minimum level should be enough to store a video portion that lasts the time required to notify the DCM manager, plus the time required to DCM treating the notification and sending orders to all the elements involved in establishing or deriving a new video flow.

Figure 4:
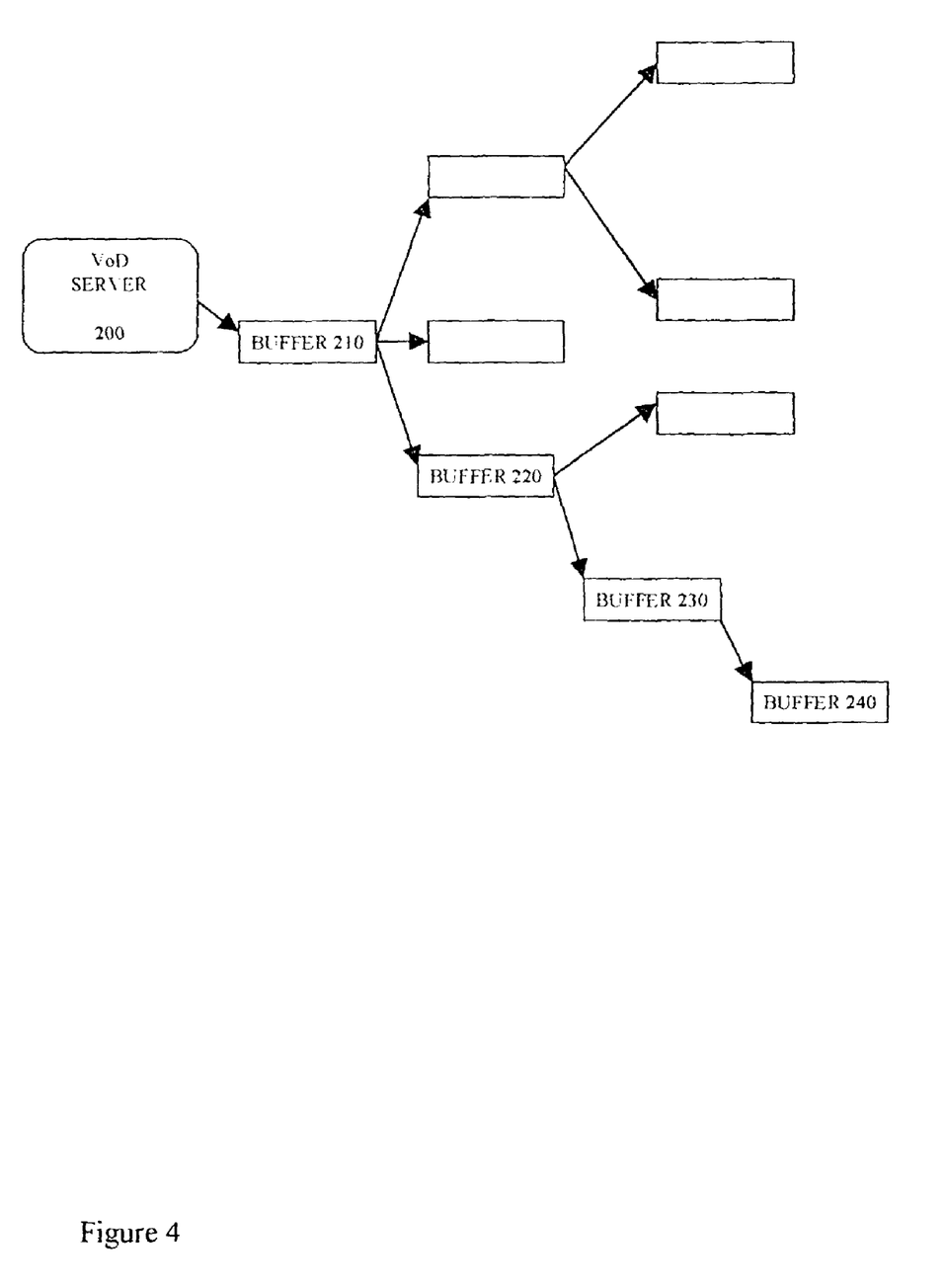
FIG. 4 Shows a buffer chain

In case of a pause operation, if the client station that makes a request is the last of a chain of buffers 240 (FIG. 4), it simply sends a notification to the DCM manager, which will order the previous client station in the chain 230 (FIG. 4), to stop sending the video flow right after a certain memory position of the buffer. In this way, the video stream that will be sent is enough to fill up the buffer 55 (FIG. 2). If the client is an element in the middle of the chain 220 (FIG. 4), the procedure is the same, except that the element of the middle of the chain continues to propagate everything that is in its buffer to the client ahead 230 (FIG. 4), providing enough time to the DCM manager to accomplish the necessary actions to send a new video flow to the client 230 (FIG. 4). The clients keep informed the DCM manager about the first and last frames that are in its buffer, so the DCM can use that portion of video whenever is necessary.

In case of a resume operation, the client notifies the DCM manager and begins to exhibit the video contents held in its buffer, giving enough time to the DCM manager to order all the necessary actions to provide a video flow starting at the next byte of the stored one in the client buffer. This flow will come either from another buffer chain or it can be a new flow from the server, if the requested portion is not stored in any established chain.

To avoid keeping another state in the server, i.e., the last frame that was sent to the client, the client that asked for a resume sends along the resume request the last received frame, facilitating DCM management. Thus, the DCM manager verifies which client buffer can supply a new flow starting from that frame. The knowledge of the frame number enables the DCM to calculate the elapsed time of a movie until that point. Based on this information, the DCM manager checks its client table and computes the difference approximately between current computer clock and the movie elapsed time in the rewinding and forwarding spaces, the latter is given by the minimum level of work, which are in the same table. The movie portion in the forwarding space defined above is calculated in a similar way to the calculated rewinding space. Now the DCM manager has the inferior and superior limits of time in which the movie should have started so that such that frame could be in its buffer. The DCM manager introduces a delta time to the inferior limit as a margin of safety in that it ensures that the movie portion is not discarded. To the superior limit it is not necessary to increase the margin of safety because new pictures are always arriving at the buffer. Given that, DCM seeks a client that has started watching the movie within the initialization time and asks the client to send a flow to the resumed client. If no client is found, DCM asks the VoD server for a new video flow.

It is important to observe that the contents of a buffer can be calculated using the average transmission rate, in this case the buffer size is divided by the average rate, obtaining the movie average time stored in the buffer or in any one of its subdivision as indicated by previous defined pointers. With the time of a movie that is stored in the buffer and the current frame exhibited it is possible to predict the frames ahead and behind the current frame in the buffer.

The fast forward and rewind operations can be implemented in two ways: moving a movie forwards/backwards until a certain point of the movie is reached, after that point the movie is shown in a normal way or moving forwards/backwards in a fast way while exhibiting the movie at a larger speed to the client.

With DCM is possible to implement both policies. To move forward or backward some minutes it is only necessary to compute the number of frames to go ahead/behind using the average transmission rate and sending the fast forward/rewind requisition to the DCM manager. If it is necessary to fill the buffer and the contents is already in an existing buffers chain, the client buffer that has the movie portion can send it in a burst, with enough contents to fill the requester's buffer and to begin normal video exhibition. In the meantime the DCM manager provides a video flow to make provision to this buffer, this flow can be the same flow that was sent in burst. If the movie portion is not in any buffer chain, the DCM manager has to order a new flow from the server starting at the client requested point. As the latency of the server is high, the necessary time to answer the request can be larger. This can be solved by allocating an emergency channel with enough bandwidth in the server to deal with such cases. In this situation the server orders a video burst, enough to fill up the client buffer after which it starts to transmit as usual. The video burst is sent using the emergency channel bandwidth, which is reserved in the server to assist exceptional cases like that. As the video burst lasts few seconds the resources that are occupied by the emergency channel are quickly released. In the latter case, a customer waits on the average less for his/her request than doing the same operation with a video-cassette-recorder. This is due to the mechanical latency of a VCR equipment to rewind the movie until the requested point. For instance, if we consider that a customer is at the beginning of a movie and wants to move fowards until the end of the movie, it will take several minutes. In contrast, accesses to movie portions in DCM don't need to be in sequence like accesses made to a magnetic tape.

It is important to notice that DCM has a better performance when several buffer chains exist (FIG. 5), i.e., it is more adapted to be used in very popular movies (hot videos) and within peak hours of service (prime viewing time). This doesn't mean that it cannot be used in situations or for movies with low demand, although in these cases its influence to the system performance and system scalability is little or none.

In order to support a fast forward/rewind with fast visualization of the movie, it is necessary that the movie is in the situation described in the previous paragraph, that is to say, be popular. If not, the server will have to support a high transmission rate, which requires a large bandwidth reserved for it. This can be solved by a special tariff policy that inhibits the customer to rarely use this resource in movies with low demand in periods of great demand or to encourage the use of discrete ff/rw with very low tariffs. In case where there are no used supplements in the system, they can also be used to store portions of movies with little demand in a static way, i.e, instead of discarding video flows, keep stored the movie portions that otherwise are simply discarded, extending the benefits of DCM outside of peak hours and for movies with smaller demand. Obviously, in case of the system needs the supplementary space to perform better, the discarding priority will select low demand contents.

Figure 5:
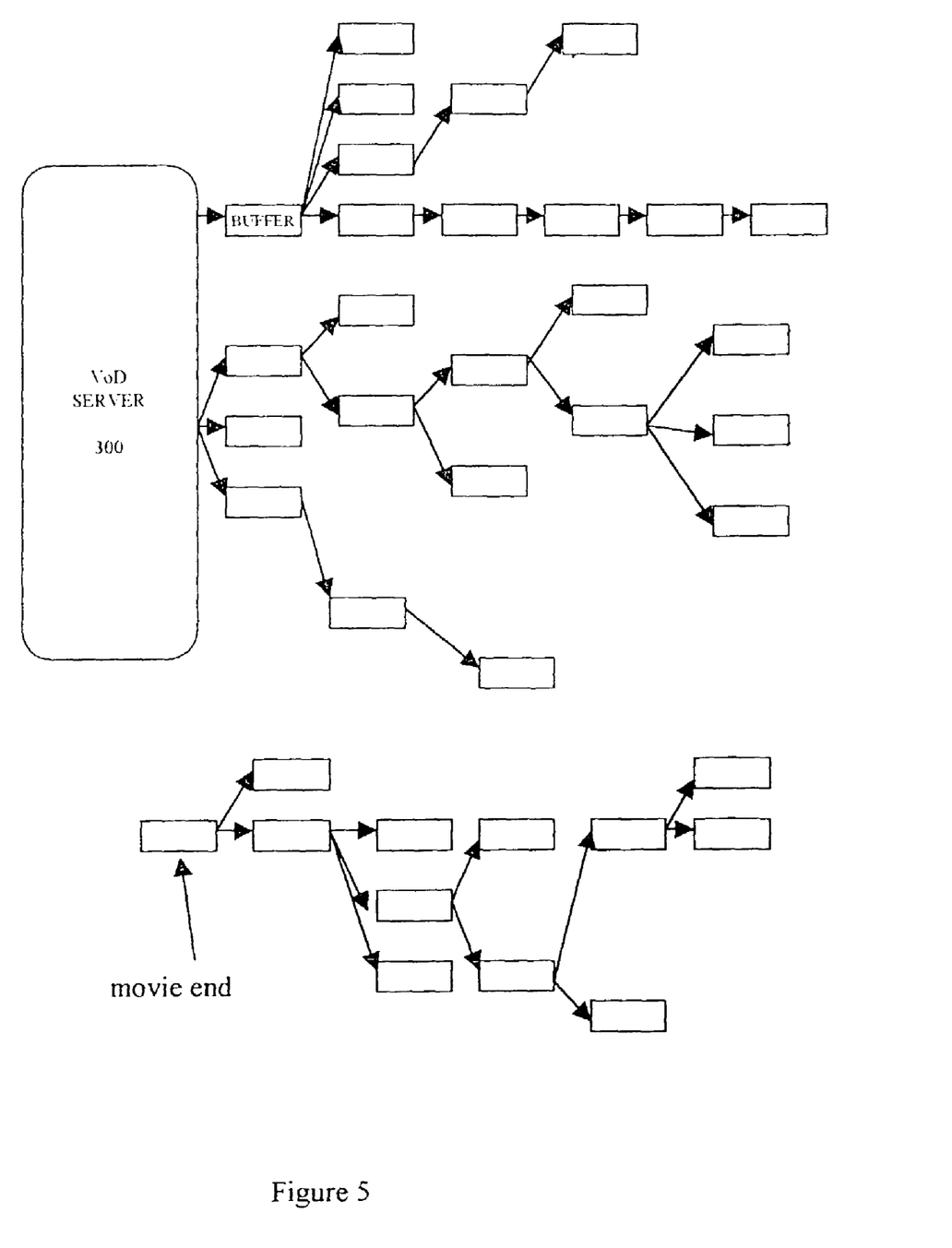
FIG. 5 Shows several buffer chains from a single movie. Also, it shows a chain that is independent of the server because the last portion of the movie is over, i.e., the last portion of the movie was already sent to the client. Although the chain is server independent, it still exists and can be used by the DCM manager.

For movies of great demand in peak hours, several different buffers chains can exist, all of them with the same movies and with several lengths, forming an arborescence (FIG. 5). In this way, it is possible that the whole movie be stored in the clients' buffers and that movie portions be replicated several times within several buffer chains. In this scenario, a fast forward or rewind is executed picking the movie portions with higher speed in several buffers spread across the network. As soon as an origin buffer contents is consumed, the DCM manager already has another origin buffer designated to send its movie portion with high-speed and so forth until the customer stop the operation or the movie arrives at its ending or beginning. This procedure can be made without using very high rate of transmission if the contents of the buffer is transmitted in parallel to the destiny buffer. In the case of a ff within a buffer chain, the next buffer to be emptied is the buffer that is behind it and so forth until arriving at the server. Note that, to implement the ff operation, the pointers of the client table that controls buffer linkage can be used. At that point the DCM manager seeks another buffer with the next portion of the movie. How DCM manager seeks the movie portion in the buffer was already explained above. If the DCM manager doesn't find any buffer with the required contents, it orders the server to transmit the video contents in burst, advancing the movie until finding some chain buffer with the video contents, from which the video burst can be sent, replacing the server. The DCM manager policy is whenever possible to request first the cooperation of standard buffers and if it is not possible then to use the supplements, and only in the last case it requests server assistance. If a client stops current operation and resumes, part of the movie that was sent in short bursts (of the size of the origin buffer) is already stored and the resume implementation in this case is equivalent to resume following a pause operation.

Another way to implement the Distributed Cooperative Memory (DCM) is to use a distributed management approach. In this case, the request of a new video flow starting from a certain picture (q) of the movie would be ordered in multicast form to all the clients that belong to the group that is watching the same movie. The clients that have the requested frame would inform the requester and this would choose one that would send the video flow or a video burst, in the latter case a request is made for fast forward/rewind with visualization. If no client had the requested video stream, i.e., after a certain time there is no answer, the client station will make the request to the server. In the case of a video burst, the video contents is just enough to fill up the buffer and a new multicast should be sent to the group to verify whether some client station has the following movie portion in its buffer. This procedure intends to alleviate the server. The clients know the frames they have in the buffer because they maintain a table 60 (FIG. 2) with this information.

However, the maintenance of such groups are a complex task and it can generate a lot of control traffic in the network, for this reason we invented a method that takes advantage of the topology of the buffer chain to avoid frequent requests to the DCM manager, which otherwise will become the system bottleneck.

In the distributed DCM system, the clients are intelligent and can take some actions on the behalf of the DCM manager, however the clients have to inform the DCM manager, for instance in a pause operation, the buffers that receive its flow about its final state so that these buffers can act to receive from another source, of course they are able to locate the appropriate source and to inform the destiny buffers, as well as the DCM manager for memory control purposes.

This system uses the pointers that point to the origin and destiny buffers in order to walk through the buffer tree (FIG. 4). A path from the tree root (server or buffer that has the last movie portion) to the leaf is what we call buffer chain 210, 220, 230, 240 (FIG. 4). To walk through the tree the client sends messages through the chain using the pointers (addresses to the ahead or behind clients). To walk ahead the ahead client address is used. To walk two clients ahead, using the ahead pointers, the client asks its front client for its ahead pointer value and so it can communicate with the client that is two connections ahead. This procedure can be repeated until it arrives at the chain end. Both ahead and behind walking, obviously, can be conjugated so that the client can walk across the tree, not only longitudinally but obliquely. The use that the client makes of such a structure works in the following way:

Pause: if some other buffer depends on the client flow it should find a substitute for it, so it walks towards the root, until finding a node (buffer) that derives a flow that is different from the one that he came and then it walks towards the leaf direction, until finding a node that has a video flow that is close to its need, then it informs the buffers that depend on its flow to receive now from this new node. In case of the video flows having small shifts, the buffer that issued a pause requests the necessary supplements to the DCM manager, a larger multicast now is sent through the requested supplement chain, which will send the delayed flow to the buffers that depend on that flow. The buffers that will receive the delayed flow will be also ready to receive it, since they were informed by the buffer that wants to pause. The flow will never be delayed, because if it is delayed it is enough to walk a node distance in direction to the root and the walking algorithm always makes that choice. In case of the necessary time retard is very large, a new video flow can be established from the server. Another alternative is used if this procedure does not find the new node in its neighborhoods, i.e., in a distance of few nodes in the tree. It requests the node to the DCM manager which has a table with information about the client buffers. Note that the degree of complexity of such a problem is very high when only local information is used, and sometimes the solution is never found, i.e., after a long time it will discover that the new node doesn't exist and therefore the flow has to come from the server, while the DCM manager has this information almost immediately. The objective of using the distributed procedure is to avoid to overload the DCM manager if locally the problem can be solved and only otherwise send the requested operation to the DCM manager.

On executing any of the following operations, the client first has to provide a substitute flow that it transmits, like in the pause operation, and next executing the requested operation, as follows:

Continuous Fast-forward: to implement a ff operation using the distributed method is the same as to walk through the tree in the root direction, requesting the buffer contents found in the way and which can be sent in sequence with a higher transmission rate or in parallel, once that the client will consume the data at higher rate. As the contents of the buffers and the network latency change dynamically, it is difficult to synchronize the requests in a perfect way, so the buffer may receive small movie portions repeatedly that should be discarded. If the movie portion is not stored in the network, the DCM manager will ask a new video flow from the server.

Continuous Rewind: the rewind is the opposite operation to fast forward, so to implement it the client has to walk the tree towards the leaves, requesting the movie portions that are in these nodes. The difficulty of walking in the leaf direction is that several paths may exist, some longer and other shorter, the ideal is to catch the longest road, i.e., the path that contains more movie portions buffered so that the client can make this operation in a continuous way in the largest possible space of time. Only using local information makes the problem complexity very high, so in a very long rewind the DCM manager, which has the information of all the nodes, can discover the inverse path, i.e., it can find out the node that is closest to the beginning of the movie. Making a search in the table, which can be indexed by a list of clients that subscribe the movie, is the same as walking in the root direction until arriving at the node that requested the rewind, and then sends the chain information to that node. In case of the chain be interrupted at some point, the server should supply the movie portion corresponding to that interruption.

Discrete fast forward, discrete rewind, and resume: it is only necessary to walk the tree in a similar way to the operations described above until finding out the buffer that contains the wanted movie portion, the only difference is that the contents of the buffers found in the way don't need to be transmitted to the node that is executing the operation, only the final contents to fill the destiny buffer until filling its minimum level of work.

The mechanisms described above, as they have been described can be applied in communication networks with strongly connected topology, i.e., practically all-to-all communication through exclusive allocated channels. However, such a topology is economically unfeasible. In tact, what do exist are more sparse topologies, which usually consist of a high capacity backbone and derivations from this backbone to the clients. We may have more than one backbone, and each one may have several redundant links to increase the bandwidth among critical points and achieve a larger reliability in the communication infrastructure. The backbone transmission capacity is limited, if compared to the transmission capacity of the internal switch which is much higher. Thus, in order to build a DCM buffer tree we cannot do it randomly because it easily will lead to backbone congestion, for instance, it is enough to place neighboring buffers in the tree that are physically in opposite points across the network. Note that it is not prohibited, but it should be strongly minimized. To do so, entire tree branches can be placed at the same switch, i.e., the communication among these buffers will be limited to take place inside the switch commutation bus, which has a strongly connected topology or close to it. To optimize the construction of such trees, DCM maintains a table in which the clients are grouped together according to their physical proximity and the search of nodes with the requested video length is always made in the following order, from the closest to the most distant node. This table is indispensable when client addresses don't have any relationship with their locations (horizontal address), as the IP addresses. If the addressing system of clients dictates their location (vertical or hierarchical addresses) as the telephone system addressing, an address itself supplies the place information, thus it is enough that the server has a table of distances (costs) between places.

While there has been shown and described the preferred embodiments of the invention, it should be appreciated that various modifications may be made without departing from the spirit of the invention or the scope of the subjoined claims.

The invention claimed is:

1. A method of managing in a centralized way video frames stored in memory buffers of a plurality of video clients (client buffers) of a Video-on-Demand System comprising the steps of:
   providing a manager, called the DCM (Distributed Cooperative Memory) manager, that receives requests and notifications sent by said video clients over a communication network and keeps this information in a client table to calculate the video frames that are in said client buffers;
   said DCM manager updating said client table upon receiving said requests and notifications sent by said video clients;
   said video clients cooperating with said DCM manager, making available the video frames that are in their said client buffers;
   said video clients serving the requests sent by said DCM manager to transmit one or more flows of video frames (video flows) to other said video clients, obeying a transmission rate and amount of video frames that are specified by said DCM manager to provide said video flows in a streaming mode;
   said video clients sending said notifications to the DCM manager regarding whether or not the requests made by said DCM manager were accomplished;
   said video clients sending said notifications to said DCM manager whenever said client buffer reaches an insufficient or an excessive amount of video frames;
   said video clients sending said notification to said DCM manager whenever transmission delays or loss of video frames occurs that lead said client buffer to reach an insufficient or an excessive amount of video frames; and
   said video clients keeping a table with information on the video frames and their relative positions in the client buffer and using the information held in said table to answer the requests sent by said DCM manager;
   wherein said video clients have a supplementary client buffer for use by said DCM manager.

2. A method of managing in a distributed way video frames stored in memory buffers of a plurality of video clients (client buffers) of a Video-on-Demand system comprising the steps of:
   providing a manager, called the DCM (Distributed Cooperative Memory) manager, that receives requests and notifications sent by said video clients over a communication network and keeps this information in a client table to calculate the video frames that are in said client buffers;
   said DCM manager updating said client table upon receiving said requests and notifications sent by said video clients;
   said video clients sending said notifications to the DCM manager regarding whether or not the requests made by said DCM manager were accomplished;
   said video clients having a supplementary client buffer for use by said DCM manager;
   said video clients sending said notifications to said DCM manager whenever said client buffer reaches an insufficient or an excessive amount of video frames;
   said video clients sending said notification to said DCM manager whenever transmission delays or loss of video frames occurs that lead said client buffer to reach an insufficient or an excessive amount of video frames;
   said video client cooperating with a group of said video clients that watches the same video (a video group) by multicasting requests of video frames over said communication network when necessary;
   said video client cooperating with said video group when said video client receives requests of frames by multicast and having the video frames in its buffer, sending the video frames to said video client that requested the video frames (requester); and
   using multicasting within said video group to request a flow of video frames (video flow) from one of the video clients of the group that has the video frames requested, starting at a certain video frame and transmitting said video flow from said client buffer to provide said video flow in a streaming mode
   said video clients keeping a table with information on the video frames and their relative positions in the client buffer and using the information held in said table to answer the requests sent within said video group.

3. A method of managing in a distributed way video frames stored in memory buffers of a plurality of video clients (client buffers) of a Video-on-Demand system comprising the steps of:
   providing a manager, called the DCM (Distributed Cooperative Memory) manager, that receives requests and notifications sent by said video clients over a communication network and keeps this information in a client table to calculate the video frames that are in said client buffers;
   said DCM manager updating said client table upon receiving said requests and notifications sent by said video clients;
   said video clients sending said notifications to the DCM manager regarding whether or not the requests made by said DCM manager were accomplished;
   said video clients having a supplementary client buffer for use by said DCM manager;
   said video clients sending said notifications to said DCM manager whenever said client buffer reaches an insufficient or an excessive amount of video frames;
   said video clients sending said notification to said DCM manager whenever transmission delays or loss of video frames occurs that lead said client buffer to reach an insufficient or an excessive amount of video frames;
   said video clients having the capability of knowing from which client buffer a flow of video frames (video flow) it receives comes from and to which client buffer it sends said video flow, allowing said client buffer to be used with a supplementary client buffer when said video client has said supplementary buffer;
   said video clients having the capability of knowing how to communicate with other said video clients to ask for which client buffer to send the video flow and from which client buffer to receive the video flow to provide said video flow in a streaming mode;

said video clients using said capabilities to walk through a chain of said client buffers to locate the video frames necessary to perform VCR operations, avoiding using said DCM manager to receive all the requests and notifications of video frames;

said video clients keeping a table with information on the video frames and their relative positions in the client buffer and using the information held in said table to answer the requests sent within said video group said video clients executing VCR operations using said chain of client buffers and only keeping the DCM manager informed on a final state of said VCR operations.

4. The method according to one of claims 1-3, wherein said method further includes:

moving video frames fast forward and fast rewind with visualization of said video frames, by providing fast access operations to the video frames using said client buffers including the step of:

sending an amount of video frames necessary for moving a video exhibition fast forward or fast rewind by using fast transmissions of video frames (video bursts) from one of said client buffers or in parallel from two or more said client buffers;

said DCM manager discovering which said client buffers together have said amount of video frames, by calculating the amount of video frames that were in said client buffer at an initialization time of the video exhibition using a video table to determine the complementary amount of video frames that can fit in said client buffer;

said DCM manager discovering which said client buffers have said amount of video frames, by calculating the amount of video frames that are in each said client buffer by using for said calculation the initialization time and the average transmission rate of the video frames;

using a fast access way of discovering a next said client buffer from which said DCM manager can order said video burst by using said chain of client buffers, said fast access way including the steps of:

after ordering all of the video frames of said client buffer, if a next video frame is to be transmitted from another client buffer, said DCM manager verifies the next available client buffer in said client table and concatenates the transmission of all the said video bursts, otherwise said DCM manager transmits its video frames in parallel; and using said supplementary client buffer to store video frames either statically or dynamically to provide said fast access.

5. The method according to claim 4, wherein said method allows the implementation of VCR functions in said video-on-demand system in an economical and scalable manner, further includngs the steps of:

upon executing a pause operation, if said video client verifies that it is a last element of said chain of client buffers, then said video client will send a notification to said DCM manager to stop the video flow;

when the client buffer reaches an excessive amount of video frames, said video client updates its said client table with initial and final video frames held in its said client buffer, so that such video frames can be used by other said video clients when necessary;

upon executing a pause operation, if said video client is in the middle of said chain of client buffers, said video client sends a notification to said DCM manager to provide a new video flow for those said video clients that are ahead in the chain of client buffers and, at the same time said DCM manager provides said video flow, said video client continues sending the video frames that remain in its client buffer to the client buffers that are ahead in the chain of client buffers;

upon executing a resume operation, said video client sends said notification to said DCM manager to provide the requested video flow and at the same time said video client starts exhibiting the video frames held in its client buffer and prepares to receive both said video burst with the missing video frames to complete the sequence of said video frames and the remainder video flow;

upon executing either fast forward or rewind operations, said video client sends said notification to said DCM manager to provide said video bursts for fast exhibition of corresponding video frames at said video client; and upon executing either said fast forward or rewind operations, without video exhibition, said video client sends a notification to said DCM manager to provide said video flow starting at the corresponding video frame.

6. The method according to claim 5, wherein said method allows said client buffer to leave said chain of client buffers without informing said DCM manager, by providing that when said client buffer reaches an insufficient amount of video frames, said video client sends a notification to said DCM manager to provide another source of video flow.

7. The method according to claim 6, wherein said method increases quality of video presentation by determining when said client buffer reaches an insufficient amount of video frames and sending said notification to said DCM manager to provide another source of video; and when said client buffer reaches an excessive amount of video frames, sending said notification to said DCM manager to stop the video flow.

8. The method according to claim 7, including the steps of:

building a tree of said chains of client buffers to minimize the amount of video flows (video traffic) over said communication network; and supplying said client table of said DCM manager with information on the places of said client buffers;

said DCM manager using the place information to build said tree to minimize the amount of video flows transmitted over the communication network.

9. The method according to claim 8, characterized by one of: the video server computers being distributed geographically and the video server computers being arranged in clusters.

10. The method according to claim 8, characterized by just using unicast to emulate a multicast.

11. The method according to claim 8, characterized by said video flows having one of a constant transmission rate and a variable transmission rate.

12. The method according to claim 8, characterized by said frames having one of a constant size or a variable size.

13. The method according to claim 8, characterized by using one of the memory buffer, the supplementary buffer, and a combination of the memory buffer and the supplementary buffer.

14. The method according to claim 8, characterized by:

using a compressed video stream that is one of MPEG1, MPEG2, MPEG4 and MJPEG and that is either in cryptogram or not in cryptogram; and using from low resolution video up to high definition standards like HDTV.

15. The method according to claim 8, characterized by using one of a video frame and a group of video frames as a working unit.

* * * * *